(12) United States Patent
Hegi et al.

(10) Patent No.: US 6,447,877 B1
(45) Date of Patent: Sep. 10, 2002

(54) PHOTOSENSITIVE COMPOSITION AND WHITE COATING

(75) Inventors: Yasuhiro Hegi; Masashi Doi, both of Kyoto (JP)

(73) Assignee: Omron Corporation, Kyoto (JP)

(*) Notice: Subject to any disclaimer, the term of this patent is extended or adjusted under 35 U.S.C. 154(b) by 0 days.

(21) Appl. No.: 09/194,052

(22) PCT Filed: May 23, 1998

(86) PCT No.: PCT/JP97/01731

§ 371 (c)(1),
(2), (4) Date: Nov. 23, 1998

(87) PCT Pub. No.: WO97/44363

PCT Pub. Date: Nov. 27, 1997

(30) Foreign Application Priority Data

May 23, 1996 (JP) .............................................. 8-153396
Apr. 18, 1997 (JP) .............................................. 9-116093

(51) Int. Cl.[7] ................................................. C08G 8/30
(52) U.S. Cl. ..................... 428/147; 430/270.1; 430/332
(58) Field of Search ................................. 428/141, 143, 428/147; 430/285.1, 270.1, 332, 338; 522/100, 103

(56) References Cited

U.S. PATENT DOCUMENTS

| 3,870,524 A | * | 3/1975 | Watanable et al. | ......... 96/115 P |
|---|---|---|---|---|
| 4,274,933 A | | 6/1981 | Kamada et al. | ........ 204/159.24 |
| 4,303,924 A | | 12/1981 | Young, Jr. | .................... 346/1.1 |
| 4,767,642 A | * | 8/1988 | Shimizu et al. | ............. 427/309 |
| 4,925,773 A | * | 5/1990 | Miyamura et al. | .......... 430/285 |
| 5,262,278 A | * | 11/1993 | Lauke et la. | ................. 430/287 |
| 5,368,973 A | * | 11/1994 | Hasegawa | .................... 430/138 |

FOREIGN PATENT DOCUMENTS

| WO | 94/03546 | 2/1994 |
|---|---|---|
| WO | 94/11450 | 5/1994 |

OTHER PUBLICATIONS

Patent Abstracts of Japan 18(575) C–1268, Nov. 4, 1994 & JP 06 211945 A (Nissin High Voltage Co. Ltd.), Aug. 2, 1994 (Abstract).

Database CA 'Online! Chemical Abstracts Service, Columbus, Ohio, "High–speed curing of UV–curable polymers on metal plates," Database accession No. 102:8339 & JP 59 132974, Jul. 31, 1984 (Abstract).

* cited by examiner

Primary Examiner—Deborah Jones
Assistant Examiner—Alicia Chevalier
(74) Attorney, Agent, or Firm—Foley & Lardner (57) ABSTRACT

A photosensitive composition comprising photopolymerizable monomers, materials incompatible with the photopolymerizable monomers, common solvents to both the photopolymerizable monomers and the incompatible materials and photopolymerization initiators. A white coating can be obtained by coating the above photosensitive composition on a substrate and irradiating ultraviolet light.

11 Claims, 5 Drawing Sheets

PHOTOSENSITIVE COMPOSITION AND WHITE COATING

FIELD OF THE INVENTION

The present invention relates to a photosensitive composition, a white coating and a production method thereof. The white coating can be obtained from a colorless, transparent liquid by coating the said photosensitive composition on a substrate and then irradiating ultraviolet light thereon.

BACKGROUND OF THE INVENTION

No white dye has been known yet until now. For this reason, white inorganic pigments such as titanium oxide have been in use for a white paint. In general, the dye is a coloring agent which colors by being dissolved in a vehicle but it does not matter whether it has dyeability or not. On the other hand, the pigment is fine colored powder which cannot be dissolved in water or solvents and has certain shapes and sizes differently from the dye.

However, since the inorganic pigments (fine powders) such as titanium oxide have necessarily been used for the white paint in the past problems as explained in the following have been pointed out.

Because the white inorganic pigments are dispersed in the liquid of the conventional white paint, the inorganic pigments settle gradually settled by the difference in the specific gravity between the liquid and the pigments, while the paint is left to rest. Especially, this tendency is remarkable in the case of the white paint of low viscosity.

When the pigments settle, the density of the pigments becomes ununiform, so that the quality of the white paint becomes unstable. For this reason, the white paint rust be stirred homogeneously at every use, which requires much time.

In addition, if the white paint is used in the condition of insufficient dispersion of the inorganic pigments by insufficient stirring, the whiteness degree (light and shade) of the letters painted by the said white paint because uneven or the opacifying property at the coated area becomes so ununiform that the substrate color is sometimes seen through.

Further, if the pigment density becomes ununiform by the settlement of the inorganic pigments, there is a danger that printer nozzles are stopped up with the inorganic pigments in the case of use of an ink-jet printer. Therefore, the ink-jet printer nozzles for white ink are furnished with a washing device for the nozzles and a stirrer unit for the ink container.

Furthermore, stopping-up or clogging of the nozzle by the white pigments occurs to a felt-pen impregnated with eraser liquid or white ink and various problems with its practical use are caused.

DISCLOSURE OF THE INVENTION

The present invention was found considering the above mentioned defects of the conventional examples, and the purpose of the present invention is to provide a novel photosensitive composition for forming a white coating which can give white color without use of the inorganic pigments.

The photosensitive composition of the present invention is colorless, transparent at an ambient temperature, but the said composition is a photocurable composition which is cured and whitened by irradiation of ultraviolet light.

Further, the present invention provides a method of forming the above mentioned white coating.

The photosensitive composition of the present invention comprises photopolymerizable monomers, materials incompatible with the said photopolymerizable monomers, common solvents which have solubility characteristics to both the said photopolymerizable monomers and the said incompatible materials and photopolymerization initiators for curing the said photopolymerizable monomers by the irradiation of ultraviolet light, and is a colorless, transparent or pale colored transparent liquid as each component is soluble in one another at an ambient temperature. The said photosensitive composition is cured and whitened to result in a white substance by irradiation of ultraviolet light. Therefore, the said composition can be used as a paint or an ink for white color.

BEST MODE FOR CARRYING OUT THE INVENTION

The photosensitive composition of the present invention comprises photopolymerizable monomers, materials incompatible with the said monomers, common solvents which have solubility characteristics to both the said monomers and the said incompatible materials and photopolymerization initiators for curing the said photopolymerizable monomers by irradiation of ultraviolet light, and is a colorless, transparent or pale-colored, transparent liquid as each component is compatible with one another at an ambient temperature. When the ultraviolet light is irradiated to the said photosensitive composition, it is cured and whitened to result in a white substance. Therefore, the said composition can be used as a paint, an ink and the like for white color.

The photopolymerizable monomers used in the present invention include monomers polymerizable by electromagnetic wave (light, ultraviolet light, electron ray, etc.) such as mono-functional monomers having, for example, a (meth)acryloyl group, a (meth)acrylamide group, an allyl group, diester of maleic acid, vinyl ether group and the like; poly-functional monomers obtained by esterification of, for example, compounds having a (meth)acryloyl group with polyhydric alcohols; and oligomers obtained by polymerization to an extent of several moles.

As the photopolymerizable monomers suitable for the present invention are esters of compounds having an acryloyl group ($CH_2$=CHCO—) with polyhydric alcohols. Examples of polyhydric alcohols are alkylene glycols such as ethylene glycol, propylene glycol, neopentyl glycol, hexylene glycol and the like; simple polyhydric alcohols such as polyalkylene glycol, glycerol, pentaerythritol, trimethylolpropane and the like; tetrahydroxymethylcyclopentanone, tetrahydroxyethylethylenediamine; ester of neopentyl glycol with hydroxypivalic acid; esters of ε-caprolactone (or its oligomers) with neo- pentyl glycol, pentaerythritol, dimer of pentaerythritol or the like; and polyhydroxy compounds such as dimethyloltricyclodecane and the like.

Examples of esters of acryloyl group with polyhydric alcohols include poly-functional monomers, for example, such as neopentyl glycol diacrylate, diacrylate of ester from hydroxypivalic acid, and neopentyl glycol, trimethylolpropane triacrylate, dimethyloltricyclodecane diacrylate and the like.

Neopentyl glycol diacrylate has the chemical formula (1) and is available, for example, from NIPPON KAYAKU CO., LTD as a trade name of "KAYARAD NPGDA":

(1)

Diacrylate of esters from hydroxypivalic acid and neopentyl glycol has the chemical formula (2), and is available, for example, from NIPPON KAYAKU CO., LTD. as a trade name of "KAYARAD MANDA".

(2)

Trimethylolpropane triacrylate has the chemical formula (3), and is available, for example, NIPPON KAYAKU CO., LTD. as a trade name of "KAYARAD TMPTA".

(3)

Dimethyloltricyclodecane diacrylate has the chemical formula (4), and is available, for example, from NIPPON KAYAKU CO., LTD. as a trade name of "KAYARAD R-684".

(4)

Other examples of the photopolymerizable monomers are, for example "KAYARAD HX-220" (available from NIPPON KAYACU CO., LTD.) having the chemical formula (5), "KAYARAD R-604" (available from NIPPON KAYAKU CO., LTD.) having the chemical formula (6), "KAYARAD GPO-303" (available from NIPPON KAYAKU CO., LTD.) having the chemical formula (7), "KAYARAD DPCA-60" (available from Nippon Kayaku) having the chemical formula (8) and the like. Among these photopolymerizable monomers tri-functional trimethylolpropane triacrylate, is preferable in order to achieve immediate whitening after the ultraviolet light irradiation.

(5)

But $\overline{m} + \overline{n} = 2$ (6)

(7)

But $a + b + c = 3.6$ (8)

The materials incompatible with the photopolymerizable monomers (referred to as incompatible materials simply hereinafter) are materials which are not soluble in the photopolymerizable monomers by mixing and separate after the mixture stirred is left to stand. Examples of the incompatible materials include, for example, water, triethanolamine, poly(vinyl acetate) and the like, thought they depend on the monomers. Triethanolamine And diethanolamine have such formula as (9), and are incompatible with the photopolymerizable monomers each other.

(9)

Diethanolamine or triethanolamine raises reactivity of the photopolymerizable monomers and accelerates their polymerization rate. Polymers such as poly(vinyl acetate) are effective to improvement of adhesion and film strength of the white coating formed.

In the above case, the common solvents for the photopolymerizable monomers and triethanolamine are isopropyl alcohol, diethylene glycol monobutyl ether and the like. Isopropyl alcohol has the chemical formula (10):

(10)

The mixture of the photopolymerizable monomers, triethanolamine and isopropyl alcohol is soluble in one another and is a colorless, transparent liquid at an ambient temperature.

Poly(vinyl acetate) has the chemical formula (11), and is incompatible with the photopolymerizable monomers each other.

(11)

In the above case, the common solvents for the photopolymerizable monomers and poly(vinyl acetate) are tetrahydrofuran, chloroform, isopropyl alcohol, diethylene glycol monobutyl ether and the like. For example, tetrahydrofuran has the chemical formula (12), and the mixture of the photopolymerizable monomers, poly(vinyl acetate), and tetrahydrofuran is compatible with one another and, a colorless, transparent liquid at an ambient temperature.

(12)

Types of photopolymerization initiators are not necessarily restricted providing that they are excellent in the solubility to the photopolymerizable monomers and do not change the color of the photopolymerizable monomers into yellow at the ultraviolet light irradiation. If, however, the photopolymerization initiators themselves are colored, there is danger that the whiteness degree is lowered by ultraviolet light curing. Therefore, in the case that the composition is used as a white paint without the inorganic pigments, the photopolymerization initiators of colorless or pale-colored transparent liquid are preferable. Examples of the photopolymerization initiators include 2-hydroxy-2-methyl-1-phenylpropane-1-one (molecular weight: 164.2; colorless to pale yellow, transparent liquid). 2-Hydroxy-2-methyl-1-phenylpropane-1-one is represented by the chemical formula (13), and is available from, for example, Ciba Specialty Chemicals Co., Ltd. as a trade name of "Darocure 1173".

(13)

Other examples of the photopolymerization initiators are 1-hydroxycyclohexylphenyl ketone (molecular weight: 204.3, white fine powder to coarse powder), 2-methyl-1-[4-(methylthio)phenyl]-2-morpholinopropanone-1 (molecular weight: 279.4, white to slightly beige powder) and the like.

Hydroxycyclohexyl phenyl ketone is represented by the chemical formula (14), and is available from, for example, Ciba Specialty Chemicals Co., Ltd. as a trade name of "Irgacure 184".

(14)

2-Methyl-1-[4-(methylthio)phenyl]-2-morpholinopropanone-1 is represented by the chemical formula (15), and is available from, for example, Ciba Specialty Chemicals Co., Ltd. as a trade name of "Irgacure 907".

(15)

Photosensitive compounds change in the rate of whitening at the ultraviolet light irradiation according to the difference in the types of the photopolymerizable monomers and the component ratios, types of the common solvents for the photopolymerizable monomers and the incompatible materials (referred to as common solvents hereinafter), the amount of the photopolymerization initiators and the like, and in some cases, the rate of whitening happens to be very slow. For example, if diacrylate of ester of neopentyl glycol with hydroxypivalic acid is used as a photopolymerizable monomer, the rate of whitening becomes slow in comparison with trimethylolpropane triacrylate and it takes several hours to several days to complete the whitening.

The mixture of the photopolymerizable monomers, the incompatible materials and the common solvents can be whitened in a wide range of formulation. For a typical example, in a system of trimethylolpropane triacrylate, triethanolamine and isopropyl alcohol, the amount of trimethylolpropane triacrylate of the photopolymerizable monomer is preferably 30% by weight or more, more preferably 40 to 50% by weight based on the total amount, considering the curability, the strength of the cured firm and the like. If the amount of isopropyl alcohol of the common solvent is small, the system of these components becomes incompatible and is not whitened. Therefore, the amount of the common solvents is preferably 20% by weight or more based on the total amount.

Besides, control of the amount of the photopolymerization initiators influences the whiteness degree. If the amount of the photopolymerization initiators is too large, the cured white film becomes yellowish white. Accordingly the amount of the photopolymerization initiators is preferably 0.1 to 1.0 part by weight, more preferably about 0.5 part by weight based on 100 parts by weight of the photopolymerizable monomers for the purpose of whitening.

Therefore, an excellent white coating can be obtained by varying the types and the amounts of the photopolymerizable monomers, the incompatible materials, the common solvents and the photopolymerization initiators.

In addition, the energy source for whitening the photosensitive compositions is the electromagnetic wave which polymerizes the photopolymerizable monomers. As the electromagnetic wave, any of visible light, ultraviolet light or electron ray is usable. The electromagnetic wave having comparatively high energy, especially the ultraviolet light is most effective, because the monomers should be cured in a short time for achieving the sufficient whitening.

For curing the photosensitive compositions by the ultraviolet light, an ultraviolet light generating source such as an ultra-high-voltage mercury lamp, a high-voltage mercury lamp, a low voltage mercury lamp, a metal halide lamp, a carbon arc lamp, a xenon lamp and the like which are generally used for ultraviolet light curable resins is irradiated. The output efficiency of the ultra-high-voltage mercury lamp and the xenon lamp is low, because the main wave length is in the region between visible light and near-infrared light. For this reason, a high-voltage mercury lamp or a metal halide lamp which contains a comparatively large amount of the ultraviolet light around 365 nm of the wave length is of practical use.

As mentioned in the above, the white coating obtained by irradiation of the ultraviolet light to the photosensitive composition forms a porous layer where agglomerates of particles of about 0.5 μm link together in the state of network in a typical microstructure.

The component of the porous layer in the state of network thus obtained consists mainly of the photopolymerizable monomers cured by the photopolymerization initiators. The incompatible materials and the common solvents are necessary for the formation of a paint for white color or the white coating, but they are not always necessary after the white coating is formed. The whiteness degree is not influenced by removing the common solvents and the incompatible materials by vaporization or solvents after the white coating is obtained.

As described In the above the white coating can be formed by mixing the photopolymerizable monomers added with the photopolymerization initiators with a solution of the incompatible materials dissolved in the common solvents and stirring the mixture to obtain the photosensitive composition, and then by coating the composition on a substrate and the like and irradiating the ultraviolet light to be whitened, but the order of mixing is optional. The photosensitive composition thus obtained lose the compatibility to result in not whitening and lowering the whiteness degree due to vaporization of the common solvents when the composition is left to stand and is contacted with air, so that the photosensitive composition once obtained is sealed and stored in the dark. When the composition is coated on a substrate, it is preferable to irradiate the ultraviolet light immediately.

The photosensitive composition can maintain its quality by being stored in a light-shielded and sealed container. Preferably, storage in the cold dark is suitable.

Besides, stability in the atmosphere can be improved by using change of the common solvents to a low volatile solvent. For example, the stability in the atmosphere is improved by using diethylene glycol monobutyl ether instead of isopropyl alcohol, so that not immediately irradiating the ultraviolet light after coating does not influence the whitening.

The term of coating in the present specification is used as a concept including not only usual coating such as brushing, spraying, dipping and the like, but also all coloring methods such as a felt pen, a writing brush, screen printing, printing, letter printing, marking and the like.

The term of substrates means all objects for forming the white coating, which include various shapes such as a plate, a tube, a sphere and the like. The material of the substrates includes plastic, glass, wood, paper, cloth, ceramic, non-woven cloth, metal, stone and the like and is not specially restricted.

The term of photosensitive composition means paints, inks (including not only usual printing inks but also inks for ink-jet printer, an ink for felt pen, an erasing ink and the like), a dyeing liquid and the like.

The photosensitive composition of the present invention is a clear liquid but can be cured and whitened by being coated on the substrates and being irradiated by the electromagnetic wave such as light, ultraviolet light and the like. Therefore, the photosensitive composition can be used as a paint for white color and a white ink. Accordingly, a photocurable paint for white colon an be prepared without use of the inorganic pigments.

The photosensitive composition of the present invention is coated on a substrate as a clear liquid and then the electromagnetic wave, particularly the ultraviolet light irradiates the coated surface to give the white coating. Further, the composition is discharged through a printer nozzle of an ink jet printer as a clear liquid and the adhered ink (the photosensitive composition) is irradiated by the ultraviolet light to show white letters and patterns.

Therefore, the paint for white color of the present invention does not contain the inorganic pigments at all and the dispensability can be ignored differently from the paint for white color containing the inorganic pigments, so that the curability is excellent and the uniform white coating, coated surface, letters and the like of the high whiteness degree can be obtained. Further, because consideration of the dispensability is not necessary differently from the inorganic pigments, non-uniformity of the whiteness degree on the white coating does not occur and there is no danger that the opacifying property is damaged even partially.

Because white particles does not precipitate due to the difference in the specific gravity by handling the photosensitive composition as a clear liquid, labor of mixing the photosensitive composition at coating is not necessary. Further, when the composition is used as an ultraviolet light curable white ink for an ink jet printer (Japanese Patent Application Open Number. Hei 5-186725 discloses a printing mechanism for an ink-jet printer using an ultraviolet light curable ink), there is also no danger that the nozzle is stopped up.

Furthermore, when the composition is used as an erasing liquid, the tip of the nozzle is not stopped up with the white pigments, and a felt pen of white color is obtained because stopping-up does not occur, when the felt is impregnated similarly with other colors for which dyes are usable.

EXAMPLES

Example 1

Examples of the present invention are illustrated concretely in the following. For the components which compose the photosensitive composition, as the photopolymerizable monomer, trimethylolpropane triacrylate ("KAYARAD TMPTA", product of NIPPON KAYAKU CO., LTD., referred to as TMPTA hereinafter); as the incompatible material, triethanolamine (referred to as TEA hereinafter); as the common solvent, isopropyl alcohol (referred to as IPA hereinafter); and as the photopolymerization initiator, 2-hydroxy-2-methyl-1-phenylpropane-1-one (Darocure 1173, product of Ciba Specialty Chemicals Co., Ltd., referred to as Darocure 1173 hereinafter) were used.

The reason, here, why Darocure-1173 was used as the photopolymerization initiator is that it is a colorless is to pale-yellow, transparent liquid, so that it does not color the photosensitive composition, and that Darocure 1173 has property of handly cuasing yellowing of the resin when the photopolymerizable monomers are cured by irradiation of the ultraviolet light, and that has excellent compatibility with the photopolymerizable monomers.

Firstly, as shown in the column of component ratios in Table 1, 100 parts by weight of TMPTA and 0.5 part by weight of Darocure 1173 were mixed, and to 100 parts by weight of the mixture of TMPTA and Darocure 1173 (referred to as TMPTA/D1173), 10 to 110 parts by weight of IPA (every 20 parts by weight) and 10 to 90 parts by weight of TEA (every 40 parts by weight) were added, and the mixture obtained was sufficiently stirred. The column at the left end in Table 1 indicates sample numbers of the 18 samples. And the column of TMPTA/D1173 in Table 1 indicates the component ratios of the mixture of 100 parts by weight of TMPTA and 0.5 part by weight of Darocure 1173, and the figure in the parentheses in the column of the component ratios in Table 1 represents the component ratios by weight percent.

TABLE 1

| Samples | Component ratios [parts by weight (weight %)] | | | Compati- | Whiteness |
|---|---|---|---|---|---|
| No. | TMPTA.D1173 | IPA | TEA | bility | degree |
| A1 | 100 (83) | 10 (8) | 10 (8) | ○ | 0 |
| A2 | 100 (63) | 10 (6) | 50 (31) | Δ | 0 |
| A3 | 100 (50) | 10 (5) | 90 (45) | × | 0 |
| A4 | 100 (71) | 30 (21) | 10 (7) | ○ | 1 |
| A5 | 100 (56) | 30 (17) | 50 (28) | ○ | 3 |
| A6 | 100 (45) | 30 (14) | 90 (41) | Δ | 1 |
| A7 | 100 (63) | 50 (31) | 10 (6) | ○ | 2 |
| A8 | 100 (50) | 50 (25) | 50 (25) | ○ | 5 |
| A9 | 100 (42) | 50 (21) | 90 (38) | ○ | 3 |
| A10 | 100 (56) | 70 (39) | 10 (6) | ○ | 2 |
| A11 | 100 (45) | 70 (32) | 50 (23) | ○ | 5 |
| A12 | 100 (38) | 70 (27) | 90 (35) | ○ | 4 |
| A13 | 100 (50) | 90 (45) | 10 (5) | ○ | 2 |

TABLE 1-continued

| Samples | Component ratios [parts by weight (weight %)] | | | Compati- | Whiteness |
|---|---|---|---|---|---|
| No. | TMPTA.D1173 | IPA | TEA | bility | degree |
| A14 | 100 (42) | 90 (38) | 50 (21) | ○ | 5 |
| A15 | 100 (36) | 90 (32) | 90 (32) | ○ | 5 |
| A16 | 100 (36) | 90 (32) | 90 (32) | ○ | 2 |
| A17 | 100 (38) | 110 (42) | 50 (19) | ○ | 5 |
| A18 | 100 (33) | 110 (37) | 90 (30) | ○ | 4 |

Each of the samples (No, A1 to A18) of the 18 photosensitive compositions thus obtained was applied on a plastic substrate made of polybutylene terephthalate resin (PBT) or ABS resin, or a glass substrate such as a slide glass and the like. Thus the substrates coated with the samples No. A1 to A18 of the photosensitive compositions were immediately put into an ultraviolet light curing apparatus and the ultraviolet light of about 1.9J/cm$^2$ was irradiated by a high voltage mercury lamp. The photosensitive composition was cured by 0.6 J/cm$^2$ or more of ultraviolet light irradiation dose when the amount of the photo-polymerization initiator was 0.5 part by weight.

Figure 1:
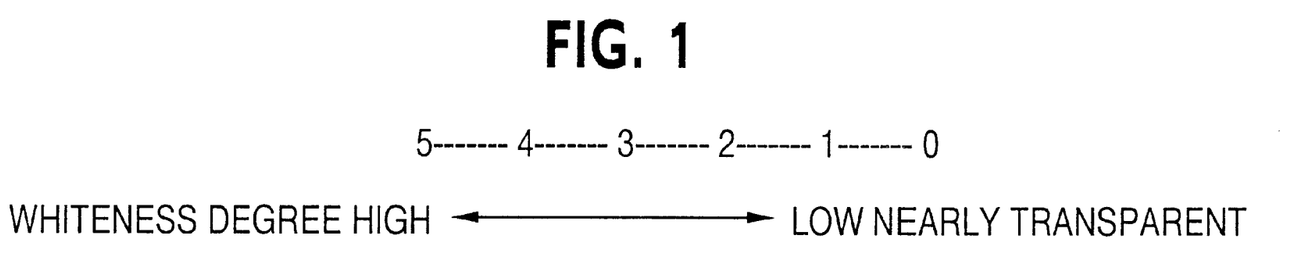
FIG. 1 illustrates a criterion of evaluation for whiteness degree.

The compatibility of each sample No. A1 to A18 of the photosensitive compositions and the whiteness degree after the ultraviolet irradiation were evaluated. The results are shown together in Table 1. The whiteness degree was evaluated according to the criterion as shown in FIG. 1.

As is apparent from. Table 1,the photosensitive composition is whitened in a fairly broad range of the component ratios, but when the amount of IPA which dissolves TMPTA and TEA is small, the system of these three components becomes incompatible and whitening does not occur. Therefore, the amount of IPA is preferably 20% by weight or more based on the total amount of the composition. Besides, as the component ratio of TMPTA reduces, both the strength of the cured coating itself and the curability decline. Therefore, the amount of TMPTA is preferably at least 30% by weight, more preferably 40 to 50% by weight based on the total amount of the composition.

As described in the above, the mechanism of the whitening of the photosensitive composition by the ultraviolet light irradiation is assumed to be as follows. Though TMPTA originally forms the association of molecules, the association is broken by the addition of IPA and the molecule movability increases. IPA interacts around the carbonyl groups of TMPTA to break the self-association of TMTPA, but when TEA is mixed, TEA interacts around the double bonds and the carbonyl groups of TMPTA to control the molecule movability of TMPTA again. At this moment, pseudo-fixation in the stereo structure of TMPTA occurs by the interaction between the carbons of the carbony group and TEA to increase the reactivity. The molecule movability of IPA is also similarity controlled. Namely, TMPTA, IPA and TEA interact one another.

When the photosensitive composition is irradiated by the ultraviolet light, TMPTA starts polymerization and chain reaction proceeds. As the photosensitive composition solidifies, TEA is liberated, but IPA is entrapped in the voids of TMPTA which began to cure. At this moment, TEA exists around the carbonyl groups of TMPTA. When the solidification of TMPTA further proceeds, TEA is also entrapped in the voids of TMPTA. Then it is assumed that IPA is liberated and volatilizes from TMPTA. As mentioned in the above, the photosensitive composition forms the fine porous layer where TMPTA particles are linked together in the state of network by the ultraviolet light irradiation to give the white color.

Figure 2:
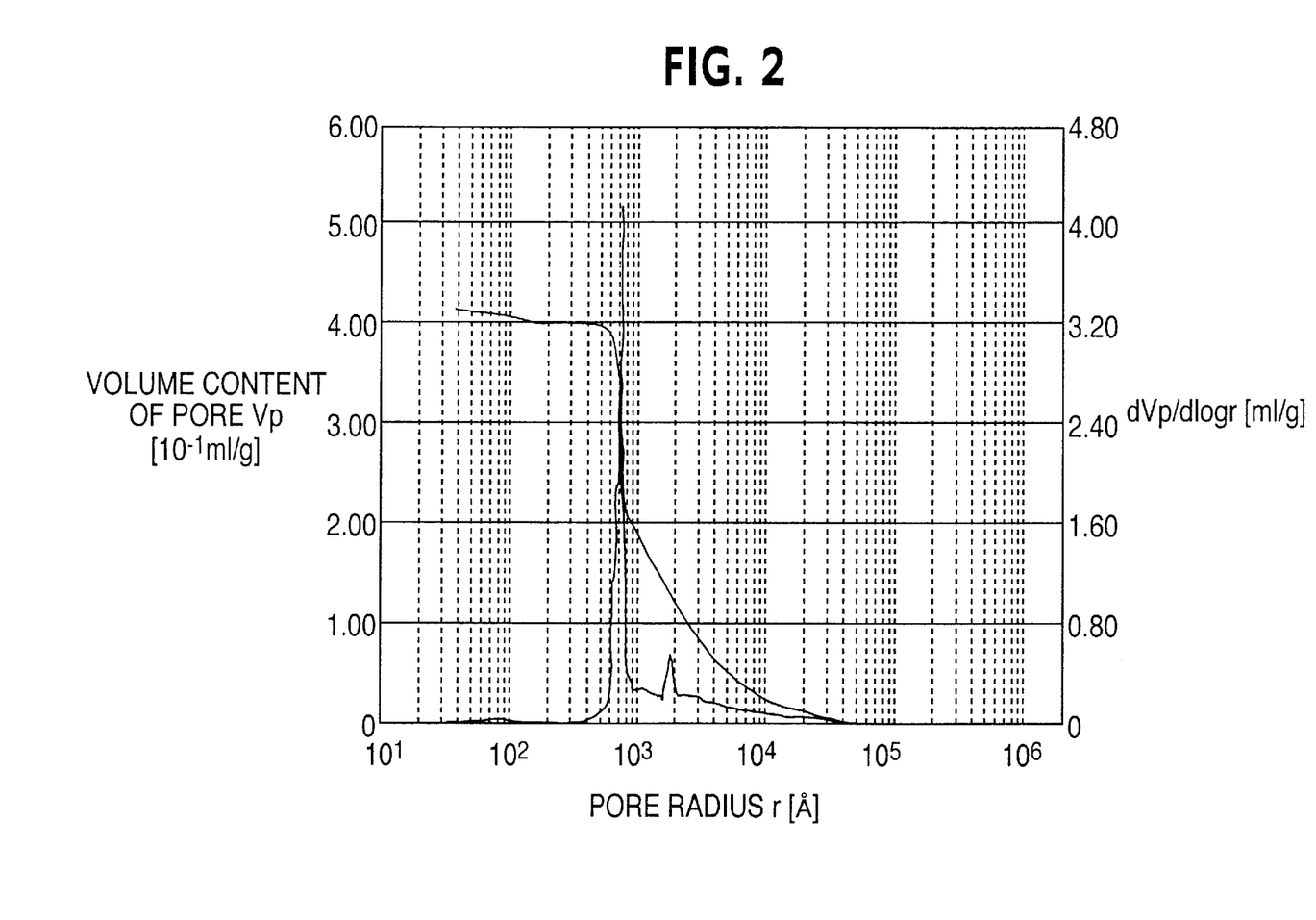
FIG. 2 illustrates a chart of pore size distribution in a white coating before elimination of TEA.
Figure 3:
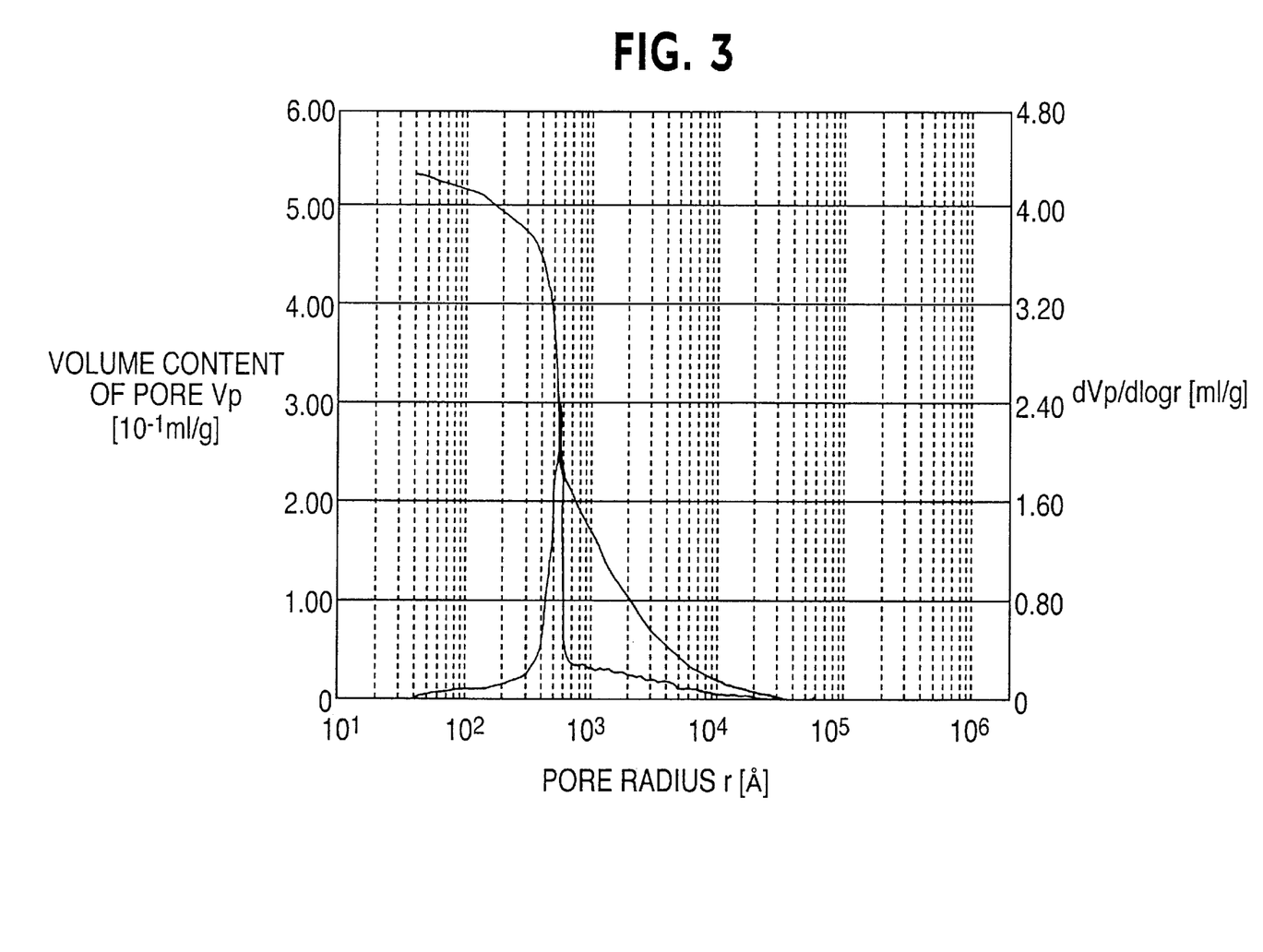
FIG. 3 illustrates a chart of pore size distribution in a white coating after elimination of TEA.

For the purpose of examining the microporous structure in the white coating thus obtained, the white coating was immersed in chloroform to remove TEA which remained in the voids of the white coating (TMPTA), and the micropores (interstices) in the white coating were observed before and after TEA was removed. The radius distribution of the micropores in the white coating was measured in a range of about 40 Å (molecule level) to about 75,000 Å of the micropore radius using Mercury Porosimeter 2000 (made by CARLO ERBA Corp.). FIG. 2 shows the radius distribution of the micropores in the white coating before TEA was removed, and FIG. 3 shows the radius distribution of the micropores in the white coating after TEA was removed. Provided that the radius of the micropore is represented by r and the volume content of the micropores having a radius r (volume content of the micropores having a radius r based on the total volume) is represented by Vp(r), the abscissa axes of FIGS. 2 and 3 show the micropore radius r, the broken lines show the change of the volume content Vp(r) of the micropores having the micropore radius r, and the solid lines show the change of dVp(r)/dlogr.

Table 2 summarizes various figures obtained from the data of the above-mentioned FIGS. 2 and 3. The volume contents of the micropores Vp(cm$^3$/cm$^3$) shown in Table 2 are the volume contents of the total micropores measured by the cumulative volume of mercury injected is a sum of the volume contents of the micropores Vp(r) regarding the micropore radius r. But, differently from the volume contents of the micropores Vp(r) in FIGS. 2 and 3, the unit is converted to the volume ratios. The specific surface area Sp (m$^2$/cm$^3$) represents the surface area (cumulative specific surface area) of the total micropores per a unit volume assuming that the micropores are cylindrical The porosity P (%) is the volume content of the micropores Vp by percentage (=Vp×100). The peak radius rp is the value of the micropore radius when dVp(r)/d log r is maximized, the median radius rm is the value of the micropore radius when the volume content of the micropores Vp(r) is 0.5 times of the maximum, and the average radius ra is calculated from ra=2Vp/Sp.

The porous structure of the white coating is supposed from he data of the volume contents of the micropores or the porosities in Table 2 and particularly, the formation of the pores by volatilization of IPA of the common solvent is suggested. Table 2 indicates that the porosity of the white coating after removal of TEA is larger. Namely, increase of the formation of the pores by the removal of TEA is suggested and the same time, it is evident that the formation of the porous structure is TMPTA of the photopolymerizable monomer.

It is apparent that the pores formed by the removal of TEA have radii of about 500 Å or less from the comparison of the radius distributions of the micropores as shown in FIG. 3 and Table 2. In addition, the peak radius rp and the average radius ra become smaller and as the result, it was found that the specific surface area Sp increased by 2 times or more by the removal of TEA.

No change in the whiteness degree, however, was observed between the white coatings before the removal of TEA of the incompatible material and the white coating after the removal of TEA. Therefore, the incompatible materials and the common solvents are essential to the process for whitening the photosensitive composition to give the white coating, but it was found that they were not always necessary for whitening of the white coating after the white coating was obtained.

Example 2

Photosensitive compositions of Example 2 ware prepared excepting that diethylene glycol monobutyl ether (referred to as butyl carbitol hereinafter) was used instead of IPA of the common solvent among the components which compose the photosensitive compositions of Example 1.

As shown in the column of the component ratios in Tables 3 and 4 (Table 4 is continued from Table 3) 0.5 part by weight of Darocure 1173 was nixed 100 parts by weight of TMPTA, and to 100 parts by weight of the mixture of TMPTA and Darocure 1173 (TMPTA·D1173), 10 to 100 parts by weigh (every 20 parts by weight, of TEA: and 10 to 100 parts by weight of butyl carbitol were added, mixed and stirred sufficiently. The figures in the parentheses in the column of the component ratios in Tables 3 and 4 represent the component ratios by weight percent.

TABLE 2

| Sample | Volume contents of micropores $V_v$[cm$^3$/cm$^3$] | Specific surface areas $S_H$[m$^2$/cm$^3$] | Peak radii $r_p$[Å] | Median radii $r_w$[Å] | Average radii $r_a$[Å] | Porosities P[%] |
|---|---|---|---|---|---|---|
| White coating cured (before removal of TEA) | 0.414 | 10.4 | 757 | 853 | 794 | 41 |
| White coating cured (after removal of TEA) | 0.526 | 23.4 | 516 | 544 | 450 | 53 |

TABLE 3

| Samples No. | Component ratios [parts by weight (weight %)] | | | Compati- bility | Whiteness degree |
|---|---|---|---|---|---|
| | TMPTA·D1173 | butylcarbitol | TEA | | |
| B1 | 100 (83) | 10 (8) | 10 (8) | ○ | 0 |
| B2 | 100 (71) | 10 (7) | 30 (21) | △ | 0 |
| B3 | 100 (63) | 10 (6) | 50 (31) | × | 0 |
| B4 | 100 (56) | 10 (6) | 70 (39) | × | 0 |
| B5 | 100 (50) | 10 (5) | 90 (45) | × | 0 |
| B6 | 100 (77) | 20 (15) | 10 (8) | ○ | 0 |
| B7 | 100 (67) | 20 (13) | 30 (20) | ○ | 1 |
| B8 | 100 (59) | 20 (12) | 50 (29) | △ | 1 |
| B9 | 100 (53) | 20 (11) | 70 (37) | × | 1 |
| B10 | 100 (48) | 20 (10) | 90 (43) | × | 1 |
| B11 | 100 (71) | 30 (21) | 10 (7) | ○ | 0 |
| B12 | 100 (63) | 30 (19) | 30 (19) | ○ | 1 |
| B13 | 100 (56) | 30 (17) | 50 (28) | ○ | 2 |
| B14 | 100 (50) | 30 (15) | 70 (35) | △ | 2 |
| B15 | 100 (45) | 30 (14) | 90 (41) | × | 2 |
| B16 | 100 (67) | 40 (27) | 10 (7) | ○ | 0 |
| B17 | 100 (59) | 40 (24) | 30 (18) | ○ | 1 |
| B18 | 100 (53) | 40 (21) | 50 (26) | ○ | 3 |
| B19 | 100 (48) | 40 (19) | 70 (33) | ○ | 3 |
| B20 | 100 (43) | 40 (17) | 90 (39) | ○ | 3 |
| B21 | 100 (63) | 50 (31) | 10 (6) | ○ | 0 |
| B22 | 100 (56) | 50 (28) | 30 (17) | ○ | 1 |
| B23 | 100 (50) | 50 (25) | 50 (25) | ○ | 3 |
| B24 | 100 (45) | 50 (23) | 70 (32) | ○ | 3 |
| B25 | 100 (42) | 50 (21) | 90 (38) | ○ | 3 |

TABLE 4

| Samples No. | Component ratios [parts by weight (weight %)] | | | Compati- bility | Whiteness degree |
|---|---|---|---|---|---|
| | TMPTA·D1173 | butylcarbitol | TEA | | |
| B26 | 100 (59) | 60 (35) | 10 (6) | ○ | 2 |
| B27 | 100 (53) | 60 (32) | 30 (16) | ○ | 3 |
| B28 | 100 (48) | 60 (29) | 50 (24) | ○ | 3 |
| B29 | 100 (43) | 60 (26) | 70 (30) | ○ | 2 |
| B30 | 100 (40) | 60 (24) | 90 (36) | ○ | 2 |
| B31 | 100 (56) | 70 (39) | 10 (6) | ○ | 2 |
| B32 | 100 (50) | 70 (35) | 30 (15) | ○ | 3 |
| B33 | 100 (45) | 70 (32) | 50 (23) | ○ | 4 |
| B34 | 100 (42) | 70 (29) | 70 (29) | ○ | 3 |
| B35 | 100 (38) | 70 (27) | 90 (35) | ○ | 2 |
| B36 | 100 (53) | 80 (42) | 10 (5) | ○ | 2 |
| B37 | 100 (48) | 80 (38) | 30 (14) | ○ | 3 |
| B38 | 100 (43) | 80 (35) | 50 (22) | ○ | 4 |
| B39 | 100 (40) | 80 (32) | 70 (28) | ○ | 3 |
| B40 | 100 (37) | 80 (30) | 90 (33) | ○ | 2 |
| B41 | 100 (50) | 90 (45) | 10 (5) | ○ | 1 |
| B42 | 100 (45) | 90 (41) | 30 (14) | ○ | 2 |
| B43 | 100 (42) | 90 (38) | 50 (21) | ○ | 2 |
| B44 | 100 (38) | 90 (35) | 70 (27) | ○ | 3 |
| B45 | 100 (36) | 90 (32) | 90 (32) | ○ | 3 |
| B46 | 100 (48) | 100 (48) | 10 (5) | ○ | 1 |
| B47 | 100 (43) | 100 (43) | 30 (13) | ○ | 2 |
| B48 | 100 (40) | 100 (40) | 50 (20) | ○ | 2 |
| B49 | 100 (37) | 100 (37) | 70 (26) | ○ | 3 |
| B50 | 100 (34) | 100 (34) | 90 (31) | ○ | 3 |

Fifty samples of the photosensitive composition (Nos. B1–B50) thus obtained were applied on a plastic substrate made of polybutylene terephthalate resin (PBT) or ABS resin or a glass substrate such as a slide glass. Thus, the substrates coated with the samples Nos. B1 to B50 of the photosensitive composition were immediately put into an ultraviolet light curing apparatus and ultraviolet light of about 1.9J/cm² was irradiated by a high voltage mercury lamp equipped in the apparatus. When the amount of the photopolymerization initiator was 0.5 part by weight, the composition was cured by 0.6J/cm² or more of the ultraviolet light irradiation dose using the high voltage mercury lamp.

The difference of the compatibility and the whiteness degree after the ultraviolet light irradiation was determined for each of the samples Nos. B1 to B50 of the photosensitive composition. The results are shown together in Tables 3 and 4. The whiteness degree was evaluated according to the criterion shown in FIG. 1 as illustrated in Example 1.

As is apparent from Tables 3 and 4, the photosensitive compositions are whitened in a fairly wide range of the components, but if the amount of butyl carbitol which dissolves TMPTA and TEA each other is small, these three components become incompatible and whitening does not occur. Accordingly, the component ratio of butyl carbitol is desirably 20% by weight or more based on the total amount. As the component ratio of TMPTA reduces, the strength of the cured coating itself and the curability decline. Therefore, the amount of TMPTA is at least 30% by weight or more, preferably 40 to 50% by weight based on the total amount.

Because the volatility of butyl carbitol of the common solvent is depressed, the stability of the photosensitive composition thus obtained in the atmosphere increases in comparison with the Example 1. Therefore, the whitening is not influenced even if the ultraviolet light is not irradiated immediately after coated.

Though a recommendable amount of Darocure 1173 is about 1.0 to 4.0 parts by weight in general, the composition of the present invention could be cured in the amount of 0.05 part by weight or more. If, however, the amount of Darocure 1173 is 3 parts by weight or more, the whole photosensitive composition becomes yellowish, so that the amount of Darocure 1173 is most preferably about 0.1 to 1.0 part by weight.

Example 3

Among the components of the photosensitive composition, trimethylolpropane triacrylate (KAYARAD TMPTA, product of NIPPON KAYAKU CO., LTD.) as the photopolymerizable monomer, poly(vinyl acetate) as the incompatible material, tetrahydrofuran (referred to as THF hereinafter) as the common solvent and 2-hydroxy-2-methyl-1-phenylpropane-1-one (Darocure 1173, product of Ciba Specialty Chemicals Co., Ltd) as the photopolymerization initiator were used.

As shown in the column of the component ratios in Tables 5 and 6 (Table 6 is continued from Table 5), 0.5, 1.0 and 2.0 parts by weight of Darocure 1173 were mixed with 100 parts by weight of TMPTA respectively, and to each of 100 parts by weight of the mixture of TMPTA and Darocure 1173 (TMPTA·D1173), 10 to 90 parts by weight (every 20 parts by weight) of poly(vinyl acetate) and 10 to 270 parts by weight of THF, the amount fo which were varied by one time, two times and 3 times of the amount of poly(vinyl acetate) were added, mixed and stirred sufficiently.

As the process, firstly by poly(vinyl acetate) and THF were mixed and stirred in the ratios of 1:1, 1:2 and 1:3 and poly(vinyl acetate) was completely dissolved. Secondly, Dalocure 1173 was mixed with each of the mixtures of TMPTA, poly(vinyl acetate) and THF which were mixed at the above-mentioned ratios in the given component ratios and stirred sufficiently.

TABLE 5

| Samples No. | Component ratios TMPTA.D1173 (Darocure 1173) | Poly(vinyl acetate).THF Rations of poly(vinyl acetate) | Mixture ratios wt (%) | Curability | Whiteness degree | Adhesion |
|---|---|---|---|---|---|---|
| C1 | 100 (0.5 phr) | 20 (50 wt %) | 83:8:8 | Δ | 2 | × (debonding) |
| C2 | 100 (1.0 phr) | | | Δ | 2 | × (debonding) |
| C3 | 100 (2.0 phr) | | | Δ~○ | 2 | × (debonding) |
| C4 | 100 (0.5 phr) | 30 (33 wt %) | 77:8:15 | Δ | 3 | × (debonding) |
| C5 | 100 (1.0 phr) | | | Δ | 3 | × (debonding) |
| C6 | 100 (2.0 phr) | | | Δ~○ | 3 | × (debonding) |
| C7 | 100 (0.5 phr) | 40 (25 wt %) | 71:7:21 | Δ | 2 | × (debonding) |
| C8 | 100 (1.0 phr) | | | Δ | 2 | × (debonding) |
| C9 | 100 (2.0 phr) | | | Δ~○ | 2 | × (debonding) |
| C10 | 100 (0.5 phr) | 60 (50 wt %) | 63:19:19 | Δ | 4 | × |
| C11 | 100 (1.0 phr) | | | Δ | 4 | × |
| C12 | 100 (2.0 phr) | | | ○ | 4 | × (debonding after 1 day) |
| C13 | 100 (0.5 phr) | 90 (33 wt %) | 63:16:32 | Δ | 4 | Δ |
| C14 | 100 (1.0 phr) | | | Δ | 4 | × |
| C15 | 100 (2.0 phr) | | | ○ | 4 | × |
| C16 | 100 (0.5 phr) | 120 (25 wt %) | 45:14:41 | Δ | 4 | × (debonding) |
| C17 | 100 (1.0 phr) | | | Δ | 4 | × (debonding) |
| C18 | 100 (2.0 phr) | | | ○ | 4 | × |
| C19 | 100 (0.5 phr) | 100 (50 wt %) | 50:25:25 | Δ | 5 | × |
| C20 | 100 (1.0 phr) | | | Δ~○ | 5 | × (debonding) |
| C21 | 100 (2.0 phr) | | | ○ | 5 | × (debonding) |
| C22 | 100 (0.5 phr) | 150 (33 wt %) | 40:20:40 | Δ | 5 | ○ |
| C23 | 100 (1.0 phr) | | | Δ~○ | 5 | ○ |
| C24 | 100 (2.0 phr) | | | ○ | 5 | ○ |
| C25 | 100 (0.5 phr) | 200 (25 wt %) | 33:17:50 | Δ | 5 | ○ |
| C26 | 100 (1.0 phr) | | | Δ~○ | 5 | ○ |
| C27 | 100 (2.0 phr) | | | ○ | 5 | ○ |

TABLE 6

| Samples No. | Component ratios TMPTA.D1173 (Darocure 1173) | Poly(vinyl acetate).THF Rations of poly(vinyl acetate) | Mixture ratios wt (%) | Curability | Whiteness degree | Adhesion |
|---|---|---|---|---|---|---|
| C28 | 100 (0.5 phr) | 140 (50 wt %) | 42:29:29 | Δ~○ | 5 | ○ |
| C29 | 100 (1.0 phr) | | | ○ | 5 | ○ (partially debonding after 1 day) |
| C30 | 100 (2.0 phr) | | | ○ | 5 | ○ (partially debonding) |
| C31 | 100 (0.5 phr) | 210 (33 wt %) | 32:23:45 | Δ~○ | 5 | Δ~○ |
| C32 | 100 (1.0 phr) | | | ○ | 5 | Δ~○ |
| C33 | 100 (2.0 phr) | | | ○ | 5 | Δ~○ |
| C34 | 100 (0.5 phr) | 280 (25 wt %) | 26:18:55 | Δ | 4 | Δ~○ |
| C35 | 100 (1.0 phr) | | | Δ~○ | 5 | Δ~○ |
| C36 | 100 (2.0 phr) | | | ○ | 5 | Δ~○ |
| C37 | 100 (0.5 phr) | 180 (50 wt %) | 36:32:32 | Δ~○ | 5 | ○ (partially debonding) |
| C38 | 100 (1.0 phr) | | | ○ | 5 | ○ (partially debonding) |
| C39 | 100 (2.0 phr) | | | ○ | 5 | ○ (partially debonding) |
| C40 | 100 (0.5 phr) | 270 (33 wt %) | 22:20:59 | Δ~○ | 4 | Δ~○ |
| C41 | 100 (1.0 phr) | | | ○ | 5 | Δ~○ |
| C42 | 100 (2.0 phr) | | | ○ | 5 | Δ~○ |
| C43 | 100 (0.5 phr) | 360 (25 wt %) | 22:20:59 | Δ~○ | 4 | Δ~○ |
| C44 | 100 (1.0 phr) | | | ○ | 5 | Δ~○ |
| C45 | 100 (2.0 phr) | | | ○ | 5 | Δ~○ |

The figures in the column of TMPTA·D1173 in Tables 5 and 6 represent the component ratios (parts by weight) of TMPTA and Darocure 1173 and the figures in the parentheses show parts by weight (phr) of Darocure 1173 based on 100 parts of TMPTA in the mixture. Further, the figures in the column of poly(vinyl acetate)·THF represent the component ratios (parts by weight) of the mixtures of poly(vinyl acetate) and THF and the figures in the parentheses represent the ratios (% by weight) of poly(vinyl acetate) in the mixtures. The column of the component ratios represents the ratios (or % by weight) of TMPTA·D1173:poly(vinyl acetate):THF.

Each of the samples of the 45 photosensitive compositions (Nos. C1–C45) thus obtained were applied or, a plastic substrate made of polybutylene terephthalate resin (PTB) or ABS resin or a glass substrate such as a slide glass. The substrates coated with each of the samples (Nos. C1–C45) of the photosensitive composition were immediately put into an ultraviolet light curing apparatus and irradiated by about 1.9J/cm$^2$ of ultraviolet light using a high voltage-mercury lamp equipped in the ultraviolet light curing apparatus.

Whitening or not-whitening, the curability and the adhesion were observed on each of the samples Nos. C1 to C45 of the photosensitive composition. The results are shown together in Tables 4 and 5. The description of partially debonding regarding the adhesion represents that there is debonded and separated part but the adhered part is in the situation of high adhesion. As for the curability and the adhesion, the mark ○ expresses good, the mark X expresses bad, and the mark Δ expresses fairly bad. The whiteness degree was evaluated by the criterion according to FIG. 1 similarily to Examples 1 and 2.

As is apparent from Tables 5 and 6, the photosensitive compositions were whitened in a comparatively wide range of the components and cured films excellent in the curability, the whiteness and the adhesion could be obtained at the amount of about 20 to 40% by weight of THPTA based on the total composition.

The photopolymerization initiator (Darocure 1173) is preferably added in the amount of 2 parts by weight or more based on 100 parts by weight of TMPTA. Because 2 parts by weight of the photopolymerization initiator is an, a mount necessary for the complete curing of TMPTA monomer, the curability of the said photosensitive initiator is considered to be equal to that of TMPTA. If the amount of the photopolymerization initiator is small, the curability lowers accordingly and the surface of the cured film is insufficiently cured to become sticky.

The amount of THF of the common solvent is preferably about two times of that of poly(vinyl acetate). If the amount of the THF is equal to that of poly(vinyl acetate), the compatibility lowers, and the ununiformity in the white coating occurs easily. On the contrary, in case that the amount of THF is lower than 3 times or more of that of poly(vinyl acetate), the whiteness degree is high but the curability lowers.

In Table 7, the white coatings obtained from the photosensitive compositions of Example 1 (or Example 2) and those of Example 3 are compared.

TABLE 7

| Resin compositions | Reactivity | Adhesion | Strength of cured films |
|---|---|---|---|
| Whitened resins from the system of TMPTA/TEA/solvent (Examples 1 and 2) | Good. Reactivity increases by interaction of TMPTA, TEA and solvent. TEA remains in cured composition. | low | brittle |
| Whitened resins from the system of TMPTA/poly(vinyl acetate)/solvent (Example 3) | Bad. No interaction between each component. Poly(vinyl acetate) remains in curod composition. | high | strong |

According to Table 7, it is characterized that the white coatings of Example 1 or 2 in which TEA was used as the incompatible material are excellent in the reactivity and the white coatings of Example 3 in which poly(vinyl acetate) was used as the incompatible material is excellent in the adhesion and the strength of the cured film.

Example 4

Trimethylolpropane triacrylate (KAYARAD TMPTA, product of NIPPON KAYAKU CO., LTD.) as the photopolymerizable monomer, 2-hydroxy-2-methyl-1-phenylpropane-1-one (Darocure 1173, product of Ciba Specialty Chemicals Co., Ltd,) as the photopolymerization initiator, and aluminum triisopropoxide (AIP-50 product of Koriyama Kasei Co.; Ltd.) as a component containing the incompatible material and the common solvent were used. AIP-50 contains triethanolamine (TEA) of the incompatible material with TMPTA and isopropyl alcohol (IPA) of the common solvent to TMPTA and TEA (aluminum triisopropoxide itself does not directly participate in whitening).

Firstly, as shown in the column of the component ratios in Table 8, 100 to 0 parts by weight of AIP-50 (every 10 parts by weight) and 0 to 100 parts by weight of TMPTA (every 10 parts by weight) were mixed and stirred sufficiently. To 100 parts by weight of each of the mixtures of AIP-50 and TMPTA, 0.5 part by weight (0.5 phr) of Darocure 1173 was added and mixed and stirred sufficiently. Each of the 11 samples of the photosensitive compositions thus obtained were applied on a plastic substrate made of polybutylene terephthalate resin (PBT) or ABS resin. The substrates coated with each of the photosensitive compositions were immediately put into an ultraviolet light curing apparatus and the ultraviolet light was irradiated for about 10 seconds by a high voltage mercury lamp in the apparatus.

Each of the samples after the irradiation of the ultraviolet light was evaluated on the curability (in Table 8, the mark ○ expresses good curability, the mark X expresses not curing and the mark Δ expresses insufficient curability) and whitening and not-whitening. The results are shown in Table 8.

TABLE 8

| Component ratios (weight ratios) | | Photopolymerizable initiator | curability | Whitening or not-whitening | Remarks | | | |
|---|---|---|---|---|---|---|---|---|
| AIP-50 | TMPTA | Darocure 1173 | | | | | | |
| 100 | 0 | 0.5phr | × | not-whitening | | | | |
| 90 | 10 | 0.5phr | △ | not-whitening | | | | |
| 80 | 20 | 0.5phr | ○ | Whitening | white film as chalk | ↑ | ↑ | low |
| 70 | 30 | 0.5phr | ○ | Whitening | white film as chalk | Whitening range | Curing shrinkage | |
| 60 | 40 | 0.5phr | ○ | Whitening | Whitening: high | | | |
| 50 | 50 | 0.5phr | ○ | Whitening | Whitening: fairly low | | | |
| 40 | 60 | 0.5phr | ○ | Whitening | Whitening: ununiform | | | |
| 30 | 70 | 0.5phr | ○ | Whitening | Whitening: low | ↓ | | high |
| 20 | 80 | 0.5phr | △ | not-whitening | | | | |
| 10 | 90 | 0.5phr | × | not-whitening | | | | |
| 0 | 100 | 0.5phr | × | not-whitening | | | | |

The composition containing the amounts of 20 parts by weight or less of AIP-50 (80 parts by weight or more of TMPTA) was insufficiently cured or was not cured at all. The photosensitive compositions of these component ratios were not whitened at all. For the samples of these component ratios sufficient curability could be obtained by increasing the photopolymerization initiator (2 phr), but phenomenon of whitening was not observed.

The samples of the photosensitive compositions having the component ratios of 90 parts by weight or more of AIP-50 (10 parts by weight or less of TMPTA) were not whitened even by the ultraviolet light irradiation. The compositions having the component ratios of 90 parts by weight or more of AIP-50 were insufficiently cured or was not cured at all by the ultraviolet light irradiation. Further, the curability was not improved even if the photopolymerization initiator was increased.

On the contrary, the white coating were formed by the ultraviolet light irradiation when the photosensitive compositions were in a range of 30 to 80 parts by weight of AIP-50. But, in case that the component raio of AIP-50 was 40 parts by weights the white coating tended to be ununiform, and in case that the component ratio of AIP-50 was 30 parts by weight, the whiteness degree was low. Further, case that the component ratios of AIP-50 were 70 parts by weight and 80 parts by weight, white films as chalk were formed by irradiating the ultraviolet light and could not be retained as printed film to result in debonding.

Therefore, preferable component ratios of AIP-50 and TMPTA were 30 to 80 parts by weight of AIP-50 and 20 to 70 parts by weight of TMPTA. Particularly, when the component ratio was 60 parts by weight of AIP-50 and about 40 parts by weight of TMPTA, the curability was excellent and the best white coating could be obtained for the property of the whiteness degree (opacifying property).

Besides, the amount of AIP-50 in the component ratio is increased, the effect of preventing cracks and debonding becomes larger because curing shrinkage becomes smaller. The ultraviolet light was irradiated for 10 seconds, but when 0.5 phr of the photopolymerization initiator was used, the photosensitive composition was cured by irradiation of the ultraviolet light for in 3 or more seconds by a high voltage mercury lamp.

The generally recommendable amount of Darocure 1173 is about 1.0 to 4.0 parts by weight, but according to the present invention, the composition was cured by addition of 0.05 part by weight (phr) or more of Darocure. However, the amount of Darocure was 3 parts by weight or more, the photosensitive compositions became wholly yellowish, so that the amount of Darocure was preferably about 0.1 to 1 part by weight.

Figure 4:
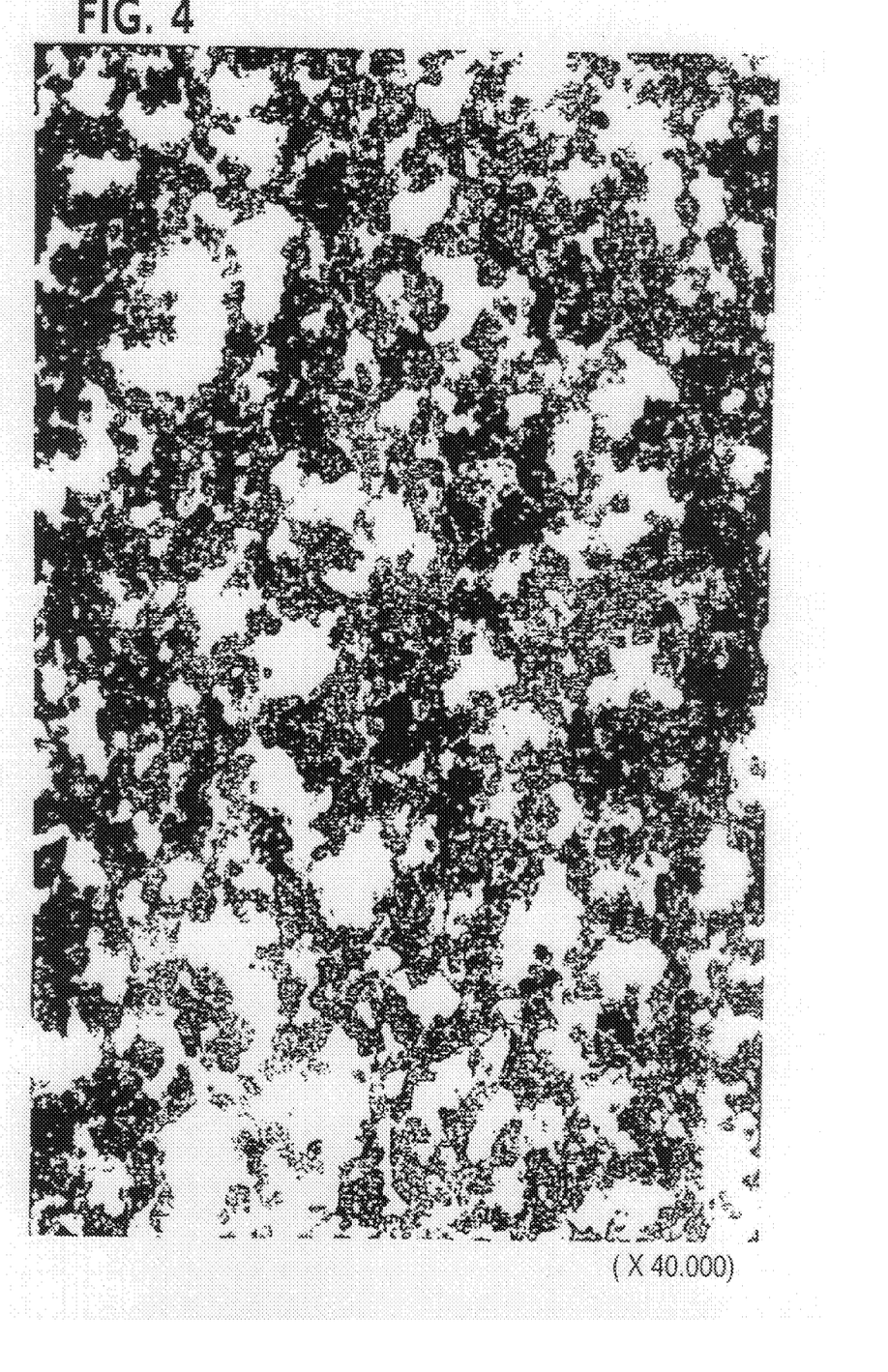
FIG. 4 is a micrograph of a micro-thin slice in the inner region of the white coating of the present invention by a transmission-type electron microscope.
Figure 5:
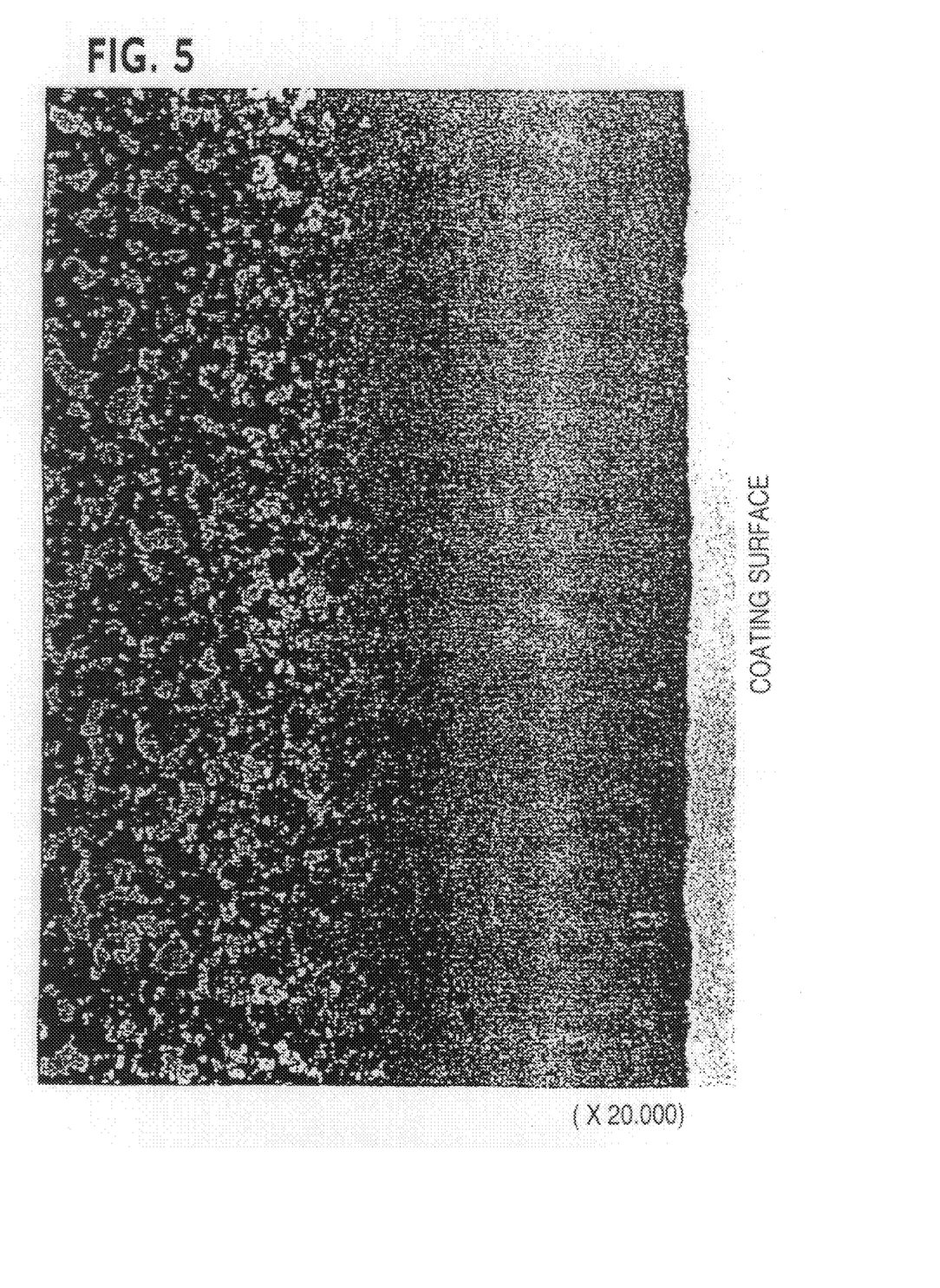
FIG. 5 is a micrograph of a micro-thin slice of region including the surface of the white coating of the present invention by a transmission-type electron microscope.

A photosensitive composition containing 60 parts by weight of AIP-50, 40 parts by weight of TMPTA and 0.5 part by weight of Darocure was irradiated by the ultraviolet light to give an excellent white coating, and then a thin slice of about 67 μm thickness was cut off from the white coating, and the electron micrograph of the thin slice was taken according to an ultrathin sectioning method by a transmission-type electron microscope. The electron micrograph (×40,000) of a thin slice cut off from the inner region of the white coating is shown in FIG. 4 and the electron micrograph (×20,000) of a thin slice cut off from the region containing the surface is shown in FIG. 5.

According to those electron micrographs, the inner portion of the white coating forms the fine porous layer where white particles of 0.5 μm diameter (black parts in the micrograph of FIG. 4) are linked in the state of network. But, shown in the micrograph of FIG. 5, the surface layer of about 3 μm thickness of the gloss side forms a dense structure with slight appearance of fine voids.

Example 5

Three parts by weight of Darocure 1173 of the photopolymerization initiator was dissolved in 100 parts by weight of trimethylolpropane triarylate (TMPTA) of the photopolymerizable monomer, and 100 parts by weight of the monomer solution obtained, 50 parts by weight of ion-exchanged water and 172 parts by weight of N,N-dimethylformamide (the common solvent) were mixed to prepare a photosensitive composition. The composition was homogeneously dissolved immediately after mixed. The composition was applied on a glass substrate, put into an ultraviolet light curing apparatus immediately and irradiated by the ultraviolet light of 1.9J/cm$^2$ by a high voltage mercury lamp. The coating was cured and whitened.

What is claimed is:

1. A photosensitive composition which comprises:
   (a) a photopolymerizable monomer,
   (b) a material incompatible with said photopolymerizable monomer, (c) a common solvent to said photopolymerizable monomer and said incompatible material, and (d) a photopolymerization initiator;

the (a) component being contained at 30% by weight or more, and dissolved in the (c) component, the (b) component being contained at 5% by weight or more, the (c) component being contained at 20% by weight or more, and the (d) component being contained at 0.1–1.0 part by weight on a basis of 100 parts by weight of the (a) component;

(a)+(b)+(c)+(d) being 100% by weight;

the composition containing no pigment; and wherein said solvent containing photosensitive composition is able to form a white coating by irradiation with an electromagnetic wave.

2. The photosensitive composition of claim 1, in which the photopolymerizable monomers are acrylates, the incompatible material is triethanolamine, the common solvent is isopropyl alcohol or diethylene glycol monobutyl ether.

3. The photosensitive composition of claim 1, in which the photopolymerizable monomers are acrylates, the incompatible material is poly(vinyl acetate), and the common solvents are selected from the group consisting of tetrahydrofuran, chloroform, isopropyl alcohol and diethylene glycol monobutyl ether.

4. A white coating which is obtained by coating a substrate with a photosensitive composition of claim 1 and irradiating the coated photosensitive composition with an electromagnetic wave.

5. A white coating which is obtained by coating a substrate with a photosensitive composition of claim 1 and irradiating the coated photosensitive composition with an electromagnetic wave to form a fine porous layer containing particles having a diameter of about 0.5 microns linked in a state of network.

6. The photosensitive composition of claim 1, in which the material incompatible with the photopolymerizable monomer is selected from the group consisting of water, triethanolamine, diethanolamine and poly(vinyl acetate).

7. The photosensitive composition of claim 1, in which the photopolymerizable monomer is contained at 40–50% by weight.

8. The photosensitive composition of claim 1 which consists essentially of:

the photopolymerizable monomer, the material incompatible with said photopolymerizable monomer, the common solvent to said photopolymerizable monomer and said incompatible material, and a photopolymerization initiator.

9. A photosensitive composition which consists essentially of:

(a) a photopolymerizable monomer, (b) a material incompatible with said photopolymerizable monomer, (c) a common solvent to said photopolymerizable monomer and said incompatible material, and (d) a photopolymerization initiator;

the (a) component being contained at 30% by weight or more, and dissolved in the (c) component, the (b) component being contained at 5% by weight or more, the (c) component being contained at 20% by weight or more, and the (d) component being contained at 0.1–1.0 part by weight on a basis of 100 parts by weight of the (a) component;

the composition containing no pigment; and wherein said solvent containing photosensitive composition is able to form a white coating by irradiation with an electromagnetic wave.

10. The photosensitive composition of claim 9, which consists of the (a), (b), (c) and (d) components.

11. A white coating which is obtained by coating a substrate with a photosensitive composition of claim 9 and irradiating the coated photosensitive composition with an electromagnetic wave.

* * * * *

UNITED STATES PATENT AND TRADEMARK OFFICE
CERTIFICATE OF CORRECTION

PATENT NO.     : 6,447,877 B1
DATED          : September 10, 2002
INVENTOR(S)    : Yasuhiro Hegi et al.

It is certified that error appears in the above-identified patent and that said Letters Patent is hereby corrected as shown below:

<u>Title page,</u>
Item [22], please correct to read as follows:

-- [22] PCT Filed: May 23, 1997 --.

Signed and Sealed this

Sixth Day of May, 2003

JAMES E. ROGAN
*Director of the United States Patent and Trademark Office*